United States Patent

[11] 3,548,976

| [72] | Inventor | Edward K. Dombeck |
| | | South Bend, Ind. |
| [21] | Appl. No. | 793,955 |
| [22] | Filed | Jan. 27, 1969 |
| [45] | Patented | Dec. 22, 1970 |
| [73] | Assignee | The Bendix Corporation |
| | | a corporation of Delaware |

[54] BRAKE SHOE BEARING MEANS
8 Claims, 5 Drawing Figs.

[52] U.S. Cl. ............................................. 188/78
[51] Int. Cl. .......................................... F16d 51/24
[50] Field of Search .............................. 188/78.9; 192/75(Inquired)

[56] References Cited
UNITED STATES PATENTS

| 2,082,244 | 6/1937 | Dick | 188/78(.9) |
| 1,913,156 | 6/1933 | Frehse | (188/78.9)UX |
| 2,111,297 | 3/1938 | Pontius, Jr. | 188/78(.9) |
| 2,287,238 | 6/1942 | Goepfrich | (188/78.9)UX |

Primary Examiner—George E. A. Halvosa
Attorneys—C. F. Arens and Plante, Arens, Hartz, Hix, Smith & Thompson and W. N. Antonis ABSTRACT: The invention relates in general to a drum brake. More particularly, this invention provides a brake shoe-bearing means operatively interposed between the brake shoe and backing plate to establish a predetermined axial relationship therebetween.

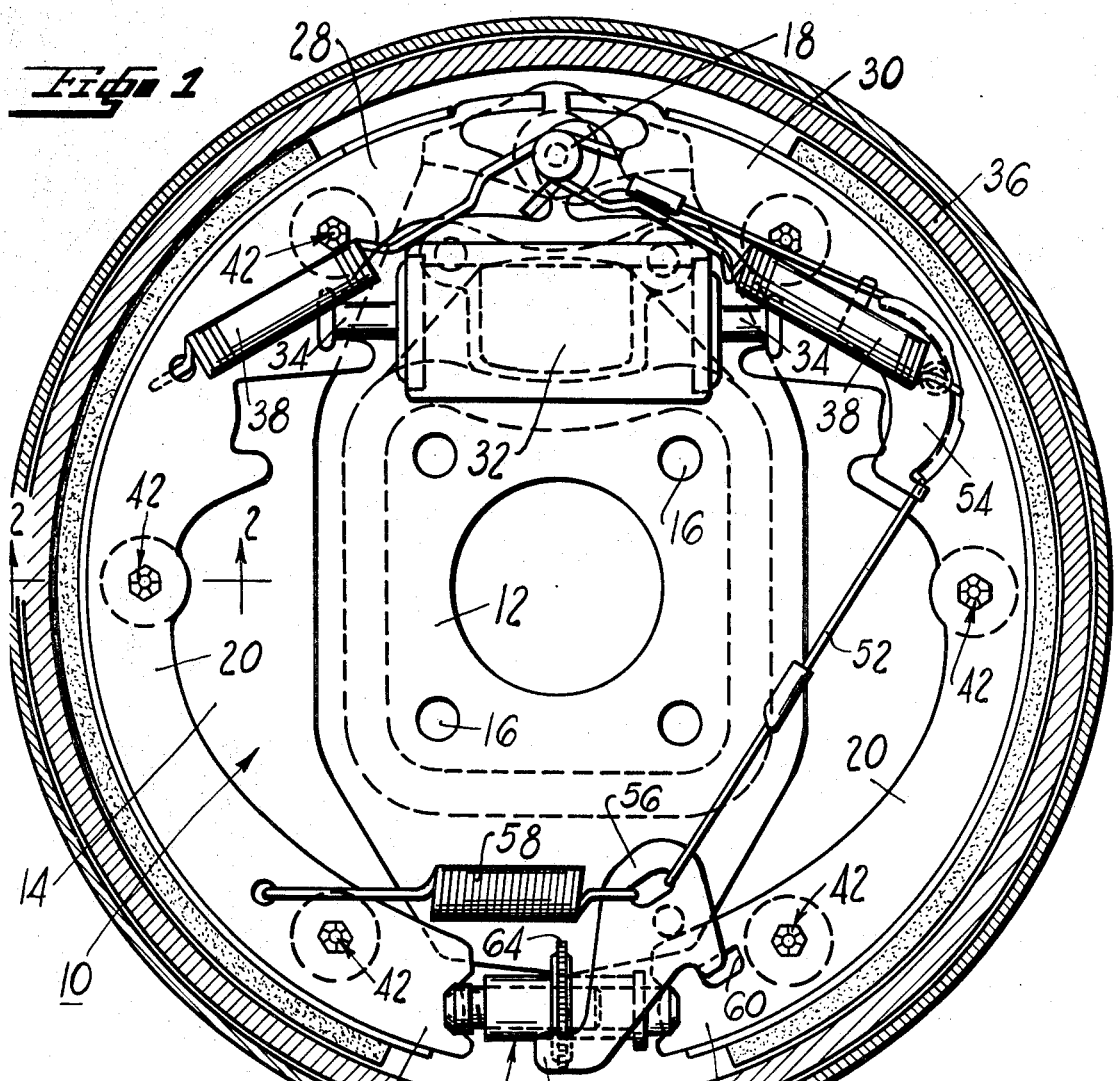

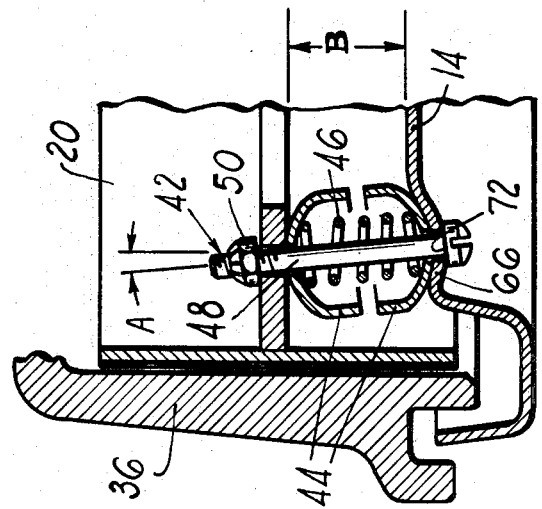
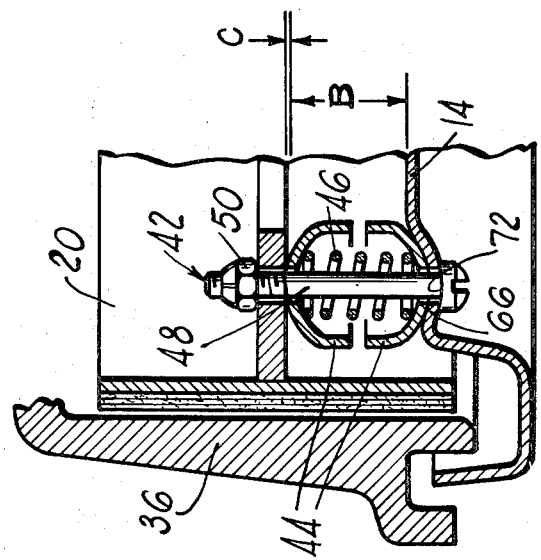
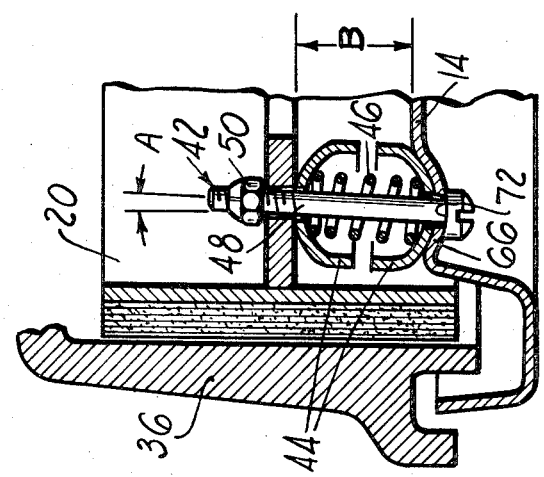
INVENTOR.
EDWARD K. DOMBECK

BRAKE SHOE BEARING MEANS

SUMMARY OF THE INVENTION

It is an object of this invention to provide a brake shoe-bearing means that does not inhibit radial and circumferential brake shoe movement during application or release of said shoe with respect to the brake drum.

It is an object of this invention to provide a brake shoe-bearing means that facilitates a substantially frictionless rolling action between the bearing means and said brake shoe and said backing plate.

It is an object of this invention to provide a brake shoe-bearing means that is simple in construction to optimize ease of manufacture and assembly, and reduce cost.

It is an object of this invention to provide a brake shoe-bearing means that assumes a new position relative to said brake shoe and said backing plate, without changing its substantially frictionless characteristics relative thereto, as brake lining wear is experienced.

Other objects and features of the invention will be apparent from the following description of the brake shoe bearing means taken in connection with the accompanying drawings.

BRIEF DESCRIPTION OF THE DRAWINGS

FIG. 1 is a front elevational view of a brake assembly;

FIG. 2 is an enlarged sectional view, partially fragmented, taken along line 2–2 of FIG. 1;

FIG. 2A is a view of the structure shown in FIG. 2 depicting the position of the brake shoe-bearing means when the brake shoe is equipped with unused lining material;

FIG. 2B is a view of the structure shown in FIG. 2, depicting the position of the brake shoe-bearing means when the lining on the brake shoe is half worn; and FIG. 2C is a view of the structure shown in FIG. 2, depicting the position of the brake shoe-bearing means when the lining on the brake shoe is worn to the point that it needs replacement.

DESCRIPTION OF THE PREFERRED EMBODIMENT

With reference now to the drawings, and specifically FIGS. 1 and 2, the brake assembly shown comprises a brake backing plate 10 having an inner member 12 and an outer member 14 with said inner member 12 having holes 16 for receiving bolts to mount the backing plate on an appropriate part of a vehicle such, for example, as the axle flange, not shown. The backing plate has an anchor member or pin 18 which may be formed integrally with said backing plate. Brake shoes 20 are slidably mounted on the backing plate 10 and have their ends 22 and 24 interconnected by an adjusting strut 26. The opposite shoe ends 28 and 30, abut said pin 18 and have interposed therebetween a fluid motor 32 which is rigidly secured to the backing plate 10. The fluid motor 32 includes a pair of oppositely acting pistons, not shown, operatively connected to the two ends 28 and 30 through force transmitting links 34. Actuation of the pistons, applies a force to each of the links tending to move the brake shoes 20 toward a rotatable drum 36 which may be secured to a wheel, not shown. Springs 38 are each on one end hooked around said pin 18 while having their respective other ends connected to the brake shoes 20, to urge said shoes into contact with said anchor pin 18 when the fluid motor 32 is not pressurized. The above arrangement also has a bearing means 42 for supporting said brake shoes 20 with respect to the backing plate 10. Said bearing means 42 comprises bearing elements or cap members 44, resilient means or spring 46, rigid means 48 and retainer means 50. The structure shown also has an automatic adjusting mechanism comprising a cable 52, a cable guide 54, a lever 56, and a spring 58. The cable 52 is attached at one end to the anchor pin 18 and has its other end connected to said lever 56. The spring 58 has one end connected to one of the brake shoes 20 and its other end connected to the lever 56. The lever 56 is pivotally connected to the other brake shoe 20 at slot 60 and has a portion 62 engaging a toothed wheel 64, which is part of the conventional adjusting strut 26.

With reference now specifically to FIG. 2, the construction of the brake shoe-bearing means 42 can be seen in greater detail. The backing plate 10, as aforementioned, is comprised of an inner member 12 and an outer member 14. The outer member 14 has situated around its outer periphery shoe supporting portions 66 having openings 68 for cooperation with said bearing means 42 to support the brake shoes 20. The brake shoes 20 have openings 70 for operable cooperation with said bearing means 42. As best seen then in FIG. 2, the rigid means 48 is inserted through the opening 68 in said shoe-supporting portion 66 and projects toward the brake shoe 20. The rigid means 48 has a retainer means or flange 72 for abutment against said backing plate to limit its movement in one direction. Each of said bearing elements or cap members 44 has an arcuate or semispherical surface 74 including a depending annular flange portion 76, said bearing surface engaging either said backing plate or the web of the brake shoe and the annular flange portion assisting in retention of the resilient means of spring 46. To assemble the bearing means 42, one of the bearing elements 44 is placed with its semispherical bearing surface against one of the shoe-supporting portions 66. The rigid means 48 is inserted through opening 68 and an opening 78 in said bearing element 44, after which the spring 46 is installed around the rigid means 48 and the second bearing element 44 is installed on the rigid means 48. The rigid means 48 is then inserted through the opening 70 in the web of brake shoe 20 and the retainer means or nut is threadedly installed on its other end, thereby limiting the total axial separation between the backing plate 10 and the web of the brake shoe 20. The spring 46 being interposed between the cap members 44 provides a predetermined preload to maintain said axial separation. As may be seen clearly in FIG. 2, the openings 68 and 70 are of predetermined diameter that is larger than that of the rigid means 48 to facilitate angular movement of said rigid means 48 as the brake shoe 20 moves radially outward toward the drum 36 in response to a braking application. It is specifically emphasized that the bearing elements 44 have arcuate bearing surfaces for contact with the web of the brake shoe and the backing plate, to minimize, if not substantially eliminate friction therebetween. The arcuate surfaces in fact provide a rolling action type friction therebetween. The arcuate surfaces in fact provide a rolling action type friction surface during periods when the brakes are being operated.

With reference now to FIGS. 2A, 2B and 2C, therein is shown the approximate position of the bearing means 42 when the brake lining material is new, half worn, and worn to the point where replacement is necessary, respectively. As seen FIG. 2A, when the brake-lining material is new, the rigid means 48 is deflected toward the right by the brake shoe 20 by an angular amount A to maintain the proper running clearance between the lining and the drum of the brake assembly. Further, the rigid means 48 and retainer means 50 are assembled so as to provide a predetermined axial separation between the backing plate 10 and the web of the brake shoe 20, which is shown here as distance B. In contrast, FIG. 2B illustrating the half-worn condition of the lining material, shows the rigid means 48 substantially perpendicular with respect to the backing plate 14. Since the length of the rigid means is fixed, the predetermined axial separation is slightly more in this position and is represented by the summation of distances B and C. In a typical brake assembly of the type shown, the distance identified as C would represent approximately .010 inch. FIG. 2C, showing the lining worn to the point where it needs replacement, depicts the rigid means 48 deflected toward the left by the brake shoe 20 by an angular amount A which results in an axial separation indicated in the drawing as distance B.

MODE OF OPERATION OF THE PREFERRED EMBODIMENT

Upon actuation of the fluid motor 32 to accomplish a braking application, the brake shoes 20 are spread into engagement with the drum 36. During the spreading of the brake shoes 20 into the drum, the semispherical bearing surfaces 74 of the bearing elements 44 will provide a substantially frictionless rolling action between said brake shoe 20 and the backing plate 10. Upon release of the braking application the return springs 38 exert a force to return the brake shoes 20 to their respective brake-released position. MOreover the bearing elements 44 will provide the same, substantially frictionless, rolling action between the web of the brake shoe and the backing plate as said shoes 20 are being returned to their brake-released position.

Although a specific embodiment has been herein described, I do not wish to be limited to the particular construction shown, and it is my intention to cover hereby all novel adaptations, modifications and their arrangement thereof which come within the practice of those skilled in the art to which the invention relates.

I claim:

1. A drum brake assembly comprising:
   a drum rotatable about an axis;
   a backing plate including shoe supporting portions having openings therein;
   a brake shoe slidably supported by said backing plate for engagement with said drum and comprising a rim and a web extending transversely from said rim;
   said web including openings substantially aligned with said openings in said shoe-supporting portions;
   a bearing means interposed between said shoe web and said backing plate shoe-supporting portions;
   said bearing means comprising a rigid means slidably installed in said openings including retainer means on each end for operatively abutting said web and said supporting portions to limit the axial separation of said web with respect to said backing plate;
   cap members having arcuate outer peripheries and including openings therein;
   a resilient means;
   said cap members being carried on said rigid means by said openings so that said arcuate surfaces engage respectively said shoe web and said shoe-supporting portions of said backing plate; and
   said resilient means being carried on said rigid means and interposed between said cap members to separate said brake web and said backing plate a predetermined axial distance while providing substantially frictionless rolling action between said cap members and said shoe web and said shoe supporting portions of said backing plate, respectively.

2. A drum brake assembly as recited in claim 1, wherein said resilient means is a coil spring.

3. A drum brake assembly as recited in claim 1, wherein said rigid means is a shaft means and said retainer means includes on one end of said shaft means a flange and on the other end a threaded portion cooperating with a locking nut.

4. A drum brake assembly as recited in claim 1, wherein said cap members include a semispherical bearing surface having a depending annular flange.

5. A drum brake assembly as recited in claim 1, wherein said shoe-supporting portions are generally arcuate in contour.

6. In a drum brake:
   a drum mounted for rotation with a member to be braked;
   a backing plate;
   a brake shoe;
   bearing means slidably mounting said brake shoe on said backing plate for movement relative thereto toward and away from said drum;
   said bearing means including a shaft extending through apertures provided in said shoe and said backing plate, a pair of cap members carried on opposite end portions of the shaft, and resilient means yieldably urging one of said cap members into engagement with said shoe and the other cap member into engagement with the backing plate; and
   said cap members having a curved bearing surface engaging said backing plate and said shoe to permit relative rocking movement between the shoe and the shaft and between the shaft and the backing plate.

7. The invention of claim 6: said cap members having a curved bearing surface engaging said backing plate and said shoe to permit relative rocking movement between the shoe and the shaft and between the shaft and the backing plate.

8. The invention of claim 7: said resilient means being a coiled spring carried by said shaft; one end of said spring engaging said one cap member, the other end of said spring engaging the other cap member.